(12) United States Patent
Getmanets

(10) Patent No.: US 9,355,143 B2
(45) Date of Patent: May 31, 2016

(54) SYSTEMS AND METHODS FOR PROVIDING A SIMPLIFIED APPLICATION PROGRAMMING INTERFACE FOR CONVERTING FROM TWO-DIMENSIONAL QUERY LANGUAGES INTO MULTI-DIMENSIONAL QUERY LANGUAGES TO QUERY MULTI-DIMENSIONAL DATA SOURCES AND MDX SERVERS

(71) Applicant: Sergiy Getmanets, New York, NY (US)

(72) Inventor: Sergiy Getmanets, New York, NY (US)

(*) Notice: Subject to any disclaimer, the term of this patent is extended or adjusted under 35 U.S.C. 154(b) by 164 days.

(21) Appl. No.: 13/952,690

(22) Filed: Jul. 29, 2013

(65) Prior Publication Data

US 2014/0032588 A1  Jan. 30, 2014

Related U.S. Application Data

(60) Provisional application No. 61/676,998, filed on Jul. 29, 2012.

(51) Int. Cl.
*G06F 7/00* (2006.01)
*G06F 17/30* (2006.01)

(52) U.S. Cl.
CPC .... *G06F 17/30427* (2013.01); *G06F 17/30592* (2013.01)

(58) Field of Classification Search
CPC .............. G06F 17/30; G06F 17/30592; G06F 17/30554; G06F 17/30522; G06F 17/246
USPC ........................................................ 707/760
See application file for complete search history.

(56) References Cited

U.S. PATENT DOCUMENTS

| | | | | |
|---|---|---|---|---|
| 2010/0030757 A1* | 2/2010 | Chordia | ............ | G06F 17/30392 707/769 |
| 2010/0121868 A1* | 5/2010 | Biannic et al. | ................. | 707/759 |
| 2010/0161289 A1* | 6/2010 | Stojanovic | .............. | G06F 17/10 703/2 |
| 2010/0250575 A1* | 9/2010 | Lukiyanov | .......... | G06F 17/3056 707/760 |
| 2012/0150913 A1* | 6/2012 | De Smet | ........... | G06F 17/30436 707/792 |

OTHER PUBLICATIONS

Agile Design LLC, "SSAS Entity Framework Provider", Jan. 7, 2012, https://web.archive.org/web/20120107192410/http://www.agiledesignllc.com/products.*
Webb, Chris, "Linq to MDX", May 27, 2008, http://blog.crossjoin.co.uk/2008/05/27/linq-to-mdx/.*
Chris Webb's BI Blog http://cwebbbi.wordpress.com/2008/05/27/linq-to-mdx/.

* cited by examiner

*Primary Examiner* — Hosain Alam
*Assistant Examiner* — Nicholas Allen
(74) *Attorney, Agent, or Firm* — FisherBroyles LLP; Richard M. Lehrer

(57) ABSTRACT

Apparatus and methods are provided for querying OLAP data sources and other MDX servers utilizing a two-dimensional query language. Aspects of the apparatus and methods receive a query written in a two-dimensional query language, such as LINQ, convert the query into a query compatible with a multi-dimensional query language, such as MDX, and employ the converted query to query the OLAP data source.

27 Claims, 8 Drawing Sheets

Figure 4: Invention Walkthrough

Figure 5: New Way – Single Model Shared by All Kinds of Data Entry and Reporting Applications

SYSTEMS AND METHODS FOR PROVIDING A SIMPLIFIED APPLICATION PROGRAMMING INTERFACE FOR CONVERTING FROM TWO-DIMENSIONAL QUERY LANGUAGES INTO MULTI-DIMENSIONAL QUERY LANGUAGES TO QUERY MULTI-DIMENSIONAL DATA SOURCES AND MDX SERVERS

CROSS REFERENCE TO RELATED APPLICATIONS

This application claims the benefit of the filing date of U.S. provisional patent application No. 61/676,998 entitled "Simplified LINQ Query API, Process of Translation from LINQ and Other Two Dimensional Query Languages into Multidimensional Query eXtensions (MDX) Query Language, Object-Multidimensional Mapping", which was filed on Jul. 29, 2012, by the same inventor of this application. That provisional application is hereby incorporated by reference as if fully set forth herein.

FIELD OF THE INVENTION

The invention relates generally to computer based query languages and more particularly to the conversion of a two-dimensional query language such as Language Integrated Query ("LINQ") into a query language for multi-dimensional Online Analytical Processing ("OLAP") such as Multi-Dimensional eXpressions ("MDX").

BACKGROUND OF THE INVENTION

In computing, online analytical processing, or OLAP is an method for answering multi-dimensional analytical queries swiftly. Typically OLAP is employed for ad-hoc queries and business reporting such as sales reports, marketing, management reports, budgeting, financial reporting etc. The basic element of an OLAP system is an OLAP or multi-dimensional cube (data source). It is made up of facts called measures which are categorized by dimensions. Measures are derived from the records in the fact table and dimensions are derived from the dimension tables. Measure Group in SSAS corresponds to a set of measure columns from a fact (transactional) table in its relational data source. Measure in an SSAS cube corresponds to a not key column in a fact (transactional) table in its relational data source. Measure column is typically of some numeric type. Dimension in an SSAS cube corresponds to a reference (dimensional) table in its relational data source. Dimension Attribute in an SSAS cube corresponds to either a column in a reference (dimensional) table or to a foreign key or date/time column in a transactional (fact) table in its relational data source. Dimension Attributes are quite often of string or date/time type.
Below we introduce new terms specific to object-multidimensional mapping:
Measure Property—a property of a class or column of a table or a cube measure suitable for aggregation functions.
Dimensional Property—a property of a class or a column of a table or a cube dimensional attribute most often used as a grouping (or sorting/joining/identifying) key.

OLAP tools enable users to analyze multi-dimensional data interactively from multiple perspectives using three basic analytical operations: consolidation (roll-up), drill-down, and slicing and dicing. Consolidation involves the aggregation of data in one or more dimensions. For example, all sales offices of a company are combined to forecast future sales. Drill-down is more granular and enables examination of the details. For example, the sales of a product are collected for a particular area. Slicing and dicing allows taking out (slicing) a specific set of data from the OLAP cube and examining (dicing) the slices from different viewpoints.

MDX, which was introduced by Microsoft®, is a powerful query language that can be used to query multidimensional OLAP data sources and other MDX servers such as SSAS Multidimensional, SSAS Tabular and Essbase. But MDX is a difficult language to master and thus it is difficult for the average programmer to write error free code. It is also difficult to employ for unit testing and refactoring due to a lack of tooling support. MDX is verbose when it comes to dimensional attribute and measure references specification and it does not support Object Oriented Programming ("OOP"). Additionally, MDX queries cannot be reused for data sources that do not support MDX like relational databases or in-memory objects. When MDX is used to query data from .NET applications developers have to add plumbing code (e.g. low-level code that bridges between the application and lower layers) to convert query parameters to MDX fragments and to convert query results from ADOMD.NET format into .NET object graphs.

For example, creating a reporting web-application in .NET using conventional techniques would require the following steps:

1. A developer creates classes and other data structures together with calculation and data verification/cleaning logic in .NET (domain layer, .NET environment);

2. A developer creates dynamic reporting layouts that may handle user actions like mouse clicks for data drill-down (in ASP.NET Web-forms, in ASP.NET MVC or in Silverlight; .NET environment, presentation layer);

3. A developer (typically a different developer since very few developers know both MDX and .NET well enough) creates parameterized MDX queries that filter, join, aggregate and sort data according to parameters (or builds non-parameterized MDX queries dynamically from .NET method parameters) and embeds these queries as strings into .NET code (data access layer, MS SQL Server Analysis Services environment);

4. A developer writes code that submits embedded MDX query strings into ADOMD.NET command, passes all parameters into that command and executes it; and, 5. A developer writes code that marshals the results of ADOMD.NET command execution (step 4) that are in a form of ADOMD.NET flattened record sets into a composition of associated .NET objects designed at step 1.

LINQ, which is a Microsoft®.NET Framework component that adds data querying capabilities to .NET languages, does not suffer from the same issues as MDX, but in its present form LINQ cannot be used to query OLAP data sources and other MDX servers such as SSAS and Essbase. LINQ also requires specification of aggregations, groupings, sorting and joins in each query. Such requirements complicate LINQ queries, slow down LINQ learning, adoption, query development and testing, and make LINQ queries more fragile to design changes.

In view of the foregoing, it would be advantageous to provide an improved query language. It would further be advantageous to provide such a query language that may be employed to query OLAP data sources and other MDX servers. It would be still further advantageous to provide such a query language that is relatively simple to learn and which is less prone to errors when coding. It would also be advantageous to provide such a query language that allows a single developer to perform steps 1-3 above without the developer having to perform steps 4 and 5.

BRIEF SUMMARY OF THE INVENTION

Many advantages of the invention will be determined and are attained by the invention, which in a broadest sense provides a two-dimensional query language that can operate to query multi-dimensional OLAP data sources and other MDX servers. It provides users the ability to employ simple semantics of two-dimensional relational query languages like LINQ or SQL together with the power of implicit data aggregation, sorting and joins of multidimensional query languages like MDX. Also users will be able to use a wider range of reporting tools, application frameworks and UI .NET components that do not support OLAP cubes and MDX servers directly, but can work with LINQ (e.g. ActiveReports, XtraReports, Visual Studio LightSwitch, WCF Data Services and OData Web API services, ASP.NET LinqDataSource and ObjectDataSource, ASPxGridView in LINQ Server Mode).

One or more embodiments of the invention provide an apparatus configured to retrieve data from an OLAP data source. The data source having associated meta-data. The apparatus includes a computing device in electrical communication with a network. The apparatus also includes an API configured to operate within the computing device and configured to receive a two-dimensional query written in a two-dimensional query language. The computing device is configured to convert the two-dimensional query into a multi-dimensional query that is compatible with a multi-dimensional query language. The computing device is also configured to retrieve, from the data source, data responsive to the multi-dimensional query.

One or more embodiments of the invention also provide a method of retrieving data from an OLAP data source, where the data source has associated meta-data. The method includes providing a computing device that selectively communicates with a network. The method further includes providing an API operating on the computing device. The computing device receives as input via the API a two-dimensional query formulated in a two-dimensional query language. The computing device converts the two-dimensional query into a multi-dimensional query and employs the multi-dimensional query to retrieve data from the data source and helps to convert the result recordsets into a graph of connected .NET objects (entities)

BRIEF DESCRIPTION OF THE DRAWINGS

For a better understanding of the invention, reference is made to the following description, taken in conjunction with the accompanying drawings, in which like reference characters refer to like parts throughout, and in which.

Figure 1:
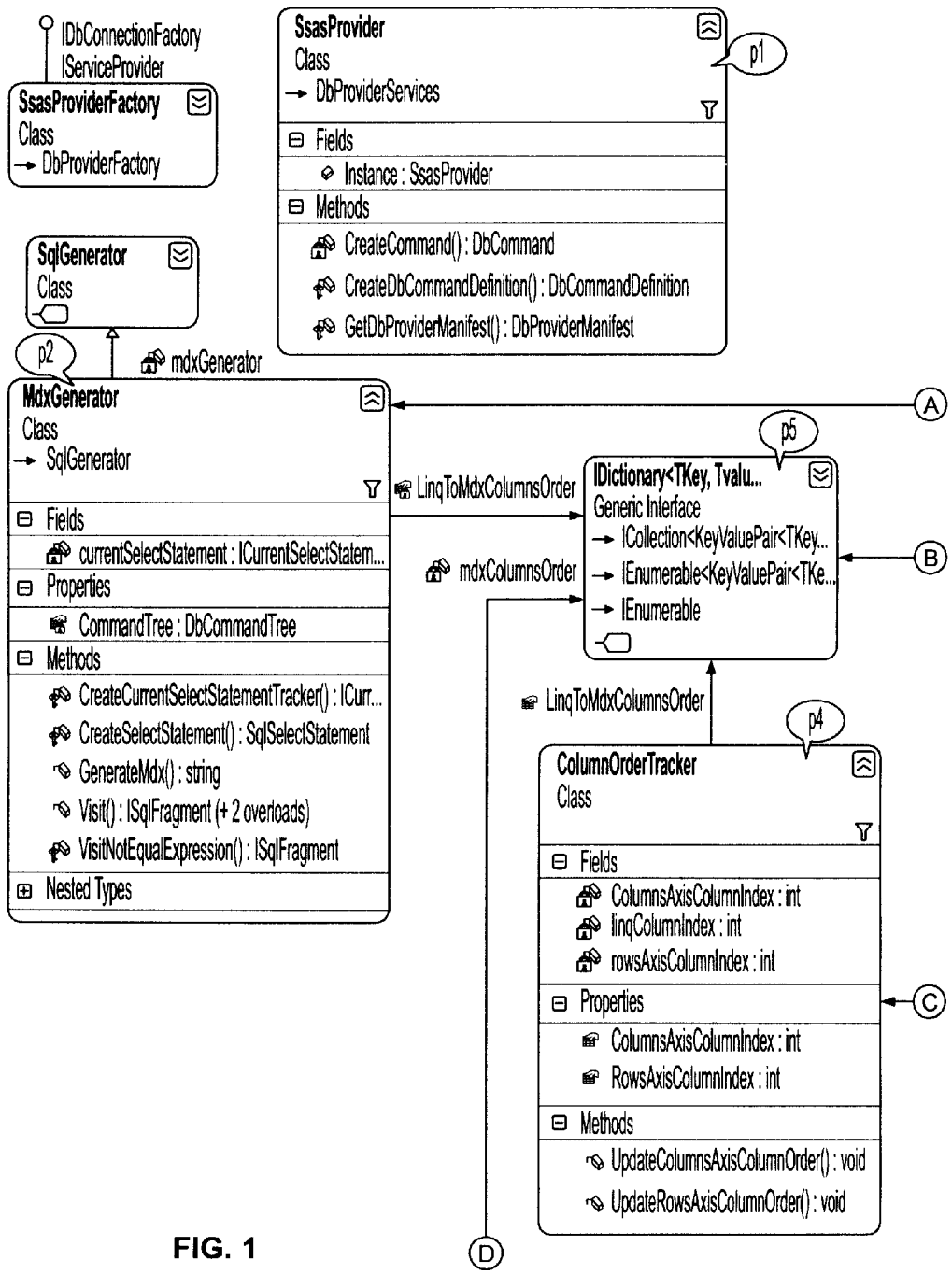
FIG. 1 is a conventional SSAS entity framework provider simplified class diagram (reduced to show some relevant members)
Figure 1:
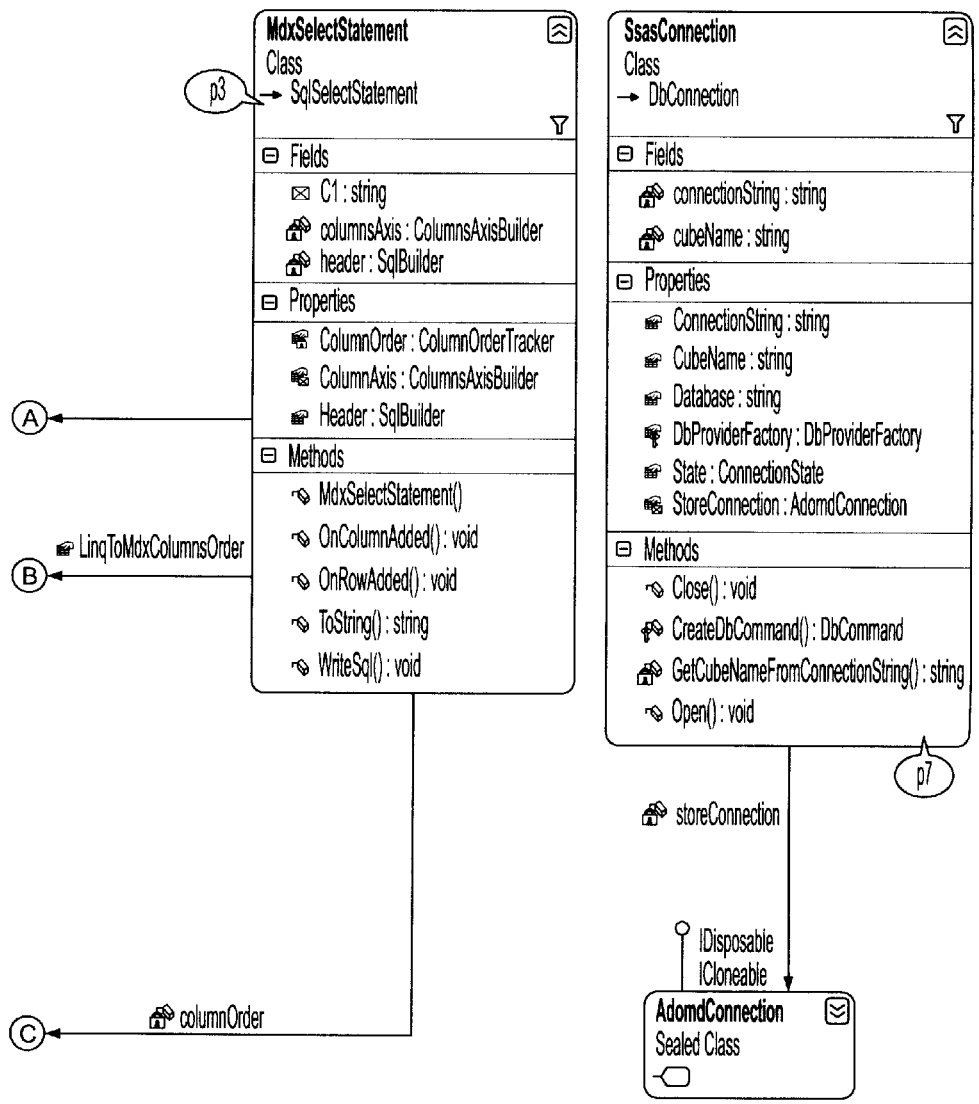
Figure 1:
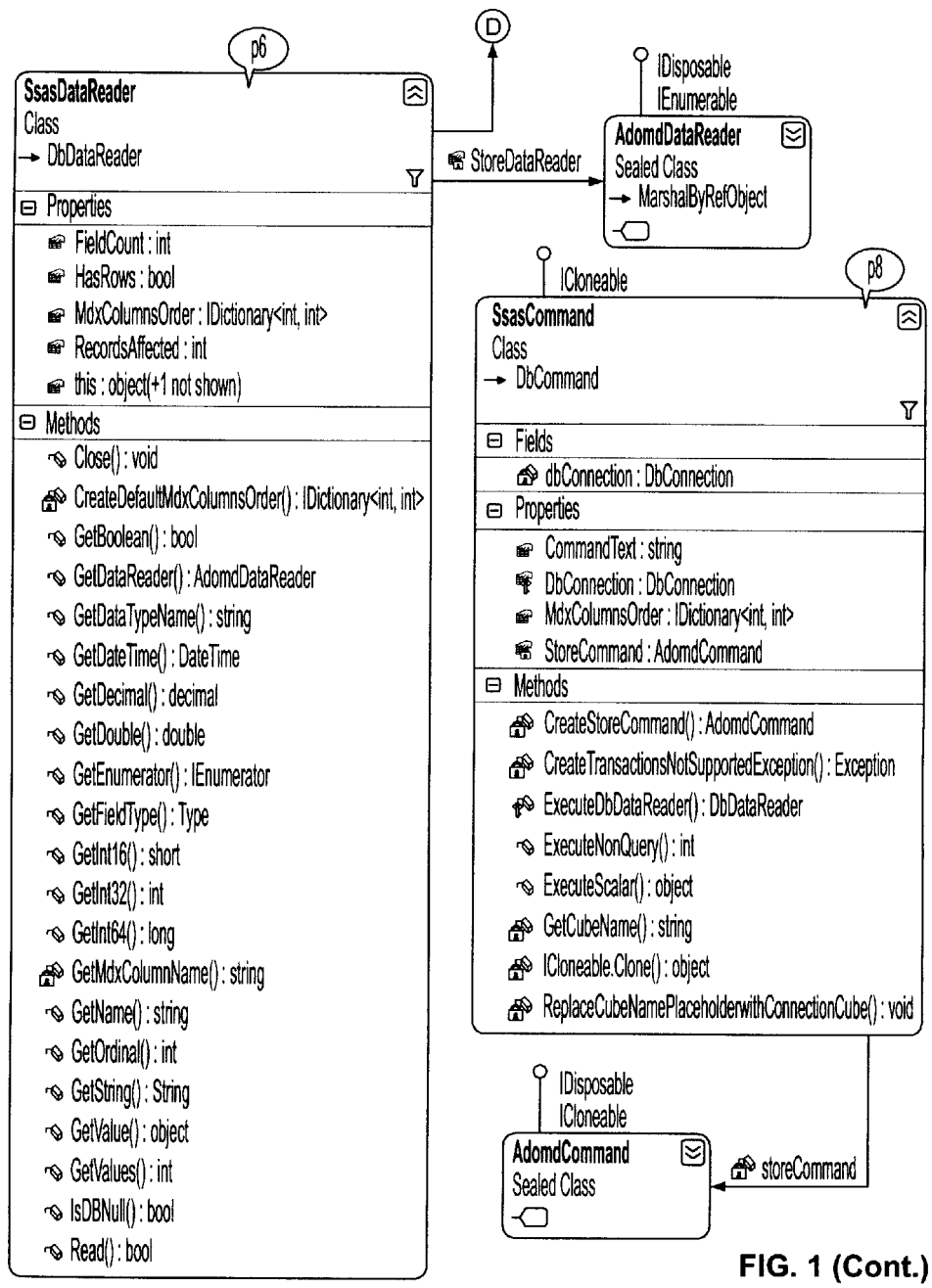

The invention will next be described in connection with certain illustrated embodiments and practices. However, it will be clear to those skilled in the art that various modifications, additions, and subtractions can be made without departing from the spirit or scope of the claims.

DETAILED DESCRIPTION OF THE INVENTION

Referring to the drawings in detail wherein like reference numerals identify like elements throughout the various figures, there is illustrated in FIGS. 1-6 a two-dimensional query language that is capable of querying multi-dimensional OLAP data sources and other MDX servers. While the following description will be limited to LINQ and MDX, those skilled in the art will recognize that the invention is not so limited. The following description is equally applicable to any component, tool or application that employs a two-dimensional relational query language, similar to LINQ or Structured Query Language ("SQL"), which is converted into multi-dimensional query language, similar to MDX. One skilled in the art will understand from this disclosure how to apply the disclosed methods to these other component(s), tool(s) and/or application(s) without undue experimentation.

Aspects of the invention provide the following general features: 1. a LINQ Application Programming Interface ("API") is modified to simplify the creation of LINQ queries (simplified LINQ queries interchangeably referred to herein as Simple Dimensional eXtension ("SDX") or LINQ) and to make LINQ more compatible with querying OLAP and other data sources; 2. a LINQ query is translated/converted into a MDX query; and, 3. methods are provided for designing and implementing Object-Multidimensional-Mapping ("OMM") components that translate one or more LINQ queries into one or more MDX queries, pass the generated MDX query into an ADOMD.NET component for execution in a binary coded operating device, takes result data from ADOMD.NET and converts it from ADOMD.NET format into .NET and ADO.NET Entity Framework format and returns results compatible with expectations of LINQ and ADO.NET Entity Framework. As an aside, OMM is similar to Object-Relational Mapping ("ORM"), but maps objects and single-dimensional relational languages to multidimensional results and languages.

Using some or all of the above features, users who create new applications, reports and queries will be able to create queries to multi-dimensional OLAP data sources and MDX servers using SDX, LINQ and any language supported by .NET and by using data returned by such queries in .NET applications and reports. Applications will be able to execute LINQ queries, consume the data returned by such queries and may act upon the results of these queries. Thus, in contrast to the example presented in the background section above, a reporting web-application in .NET could be created using the invention by the following steps:

1. A developer creates classes and other data structures together with calculation and data verification/cleaning logic in .NET (domain layer, .NET environment);

2. A developer creates interactive reporting layouts that may handle user actions like mouse clicks for data drill-down (in ASP.NET Web-forms, in ASP.NET MVC or in Silverlight, presentation layer, .NET environment); and, 3. A developer creates LINQ queries that filter, join, aggregate and sort data. The developer does not need to create and populate parameters, or embed LINQ queries as strings into .NET code because LINQ is integrated into .NET (data access layer, .NET environment). Further, the developer does not need to write code for steps 4-5 in the background example, since this work is handled by the SSAS Entity Framework Provider component and Microsoft ADO.NET Entity Framework. Thus development and testing, work and time are saved. Further, step 3 can be performed by the same developer since it is common for .NET developers to also know LINQ (which is part of .NET).

The above aspects are preferably implemented as a computer program stored 230 on a computer 200 which causes the computer 200 to function as a data retrieving system, for retrieving data stored on cubic or tabular data structures in locally 240 or remotely 250 located MDX servers accessible over the Internet 260 or some other compatible network 260, without utilizing MDX as an API. The program is executed on a Windows® operation system ("OS") (this limitation is imposed by the fact that Microsoft ADOMD.NET is currently only existing for Windows OS. If this changes in the future then this limitation will change accordingly). The program causes the computer to execute LINQ to achieve one or optionally more of joining, grouping, aggregating, filtering and/or sorting data. The program utilizes SDX dialect of LINQ along with metadata of the cubic data structures and MDX servers so that aggregation, joining and grouping operators of LINQ are optional rather than required, thereby enabling the reduction/simplification of standard LINQ queries.

The following illustrates an example of how to simplify the LINQ API and make LINQ more useable for querying OLAP and other data sources.

Simplify "Aggregations" in a LINQ Query: Make implicit aggregations—aggregate all Measure Properties listed for projection in a "select" clause, even if no aggregation functions are explicitly specified in a query. A more detailed explanation of the process for determining Measure Properties suitable for aggregation among all projected properties listed in Select( ) will be set forth later in this disclosure. In order to determine a kind of an aggregation function, specify it in metadata outside of a query (e.g. in a cube metadata, file or .Net manifest as attributes). If a kind of an aggregation function is indicated explicitly somewhere in a LINQ query, use all regular LINQ conventions for the aggregation of those Measure and/or Dimensional Properties with an explicit aggregation function. Aggregate all other Measure Properties implicitly. If a kind of an aggregation function is not specified anywhere, neither in metadata nor in a query, use Sum( ) as a default.

By way of a non-limiting example:

```
Query 1 - Standard LINQ to Entities (conventional):
from order in context.OrderDetails
select new
{
    Quantity = context.OrderDetails.Sum(o => o.Quantity),
    Discount = context.OrderDetails.Sum(o => o.Discount),
    UnitPrice = context.OrderDetails.Average(o => o.UnitPrice)
}
Query 2 - SDX (new):
from order in context.OrderDetails
select new
{
    order.Quantity,
    order.Discount,
    order.UnitPrice
}
```

Query 2 should return a single row result Recordset that is identical to a result of conventional query 1 provided that "Average" kind of an aggregation function is specified for order.UnitPrice property somewhere outside of the query (e.g. in a cube metadata). "Sum" will be applied as a default kind of an aggregation function to order.Quantity and order.Discount properties if their aggregation type is not specified anywhere, or is specified as "Sum".

Simplify "Group By" section in a LINQ Query: Make implicit groupings—group results of queries by default, even if there is no "group . . . by" section or GroupBy( ) extension method explicitly specified in a query. When "group . . . by" is missing in a query use all Dimensional Properties specified in a projection part of a query as grouping keys. A more detailed explanation of the process for determining what projection properties (columns) are suitable for grouping will be set forth later in [0030] of this disclosure. If an explicit "group . . . by" clause is present in a LINQ query, use all standard LINQ conventions for grouping.

By way of a non-limiting example the following 2 queries return the same result:

```
Query 3 - Standard LINQ (conventional):
from orderDetails in context.OrderDetails
group orderDetails by orderDetails.ProductID into grouped
select new
{
    grouped.Key, // group by key - orderDetails.ProductID
    grouped.Sum(g => g.Quantity),
    grouped.Sum(g => g. Discount),
    grouped.Average(g => g. UnitPrice)
}
Query 4 - SDX (new):
from orderDetails in context.OrderDetails
select new
{
    orderDetails.ProductID, // group by key
    orderDetails.Quantity,
    orderDetails.Discount,
    orderDetails.UnitPrice
}
```

Simplify "orderby" clause in a LINQ Query: Sort query results containing Dimensional Properties implicitly—sort query results by default, even if there is no explicit "orderby" keyword and OrderBy( ) extension method in a query. If "orderby" clause is not present in a LINQ query sort by all Dimensional Properties included into projection ("select" clause of a query) by either "select" keyword or Select( ) extension method. A more detailed explanation of the process for determining what projection properties (columns) should be used as Dimensional Properties (sort keys) when both "orderby" keyword and OrderBy( ) extension method are missing will be set forth later in this disclosure. If there are multiple sort keys in a query, sort them in the same sequence in which Dimensional Properties (columns) are specified in a query. If an explicit "orderby" clause is present in a LINQ query, first sort explicitly indicated properties (columns) using all standard LINQ conventions for sorting, then also sort all other Dimensional Properties implicitly.

By way of a non-limiting example:

```
Query 5 - Standard LINQ (conventional):
from orderDetails in context.OrderDetails
orderby
orderDetails.ProductID,
orderDetails.OrderID
select new
{
    orderDetails.ProductID,
    orderDetails.OrderID,
```

-continued

```
        orderDetails.Quantity,
        orderDetails.Discount,
        orderDetails.UnitPrice
    }
Query 6 - SDX (new):
from orderDetails in context.OrderDetails
select new
    {
        orderDetails.ProductID,
        orderDetails.OrderID,
        orderDetails.Quantity,
        orderDetails.Discount,
        orderDetails.UnitPrice
    }
```

The results from both queries are sorted by ProductID first and then by OrderID.

Simplify "joins" in a LINQ Query: Make joins implicitly—join query results, even if there is no explicit join keywords or extension methods in a query. Allow to specify a query like it is a cross-join (e.g. by using multiple "from" . . . without corresponding "join"); but instead of returning a Cartesian product in such a case, return a normal joined Recordset using default join conditions specified in metadata outside of a query (e.g. in a cube definition, database keys and constraints, class associations, .Net manifest or metadata file). Thus instead of having to repeat each join condition specification in each query SDX allows the specification of joins only once in metadata outside of queries. It also enables the writing of very simple queries for several related entities with no navigational properties. Thus users can reduce coupling between entities (classes they query) by removing some or all of the navigational properties (associations) from the entities without impacting query complexity. If an explicit "join" clause is present in a LINQ query, use all standard LINQ joining rules for that specific join, but all other entities should still be joined with implicit default join conditions specified in metadata. If there is no metadata about joins is present, return a cross-join (Cartesian product).

By way of a non-limiting example the following 2 queries return the same joined result:

```
Query 7 - Standard LINQ (conventional)
from order in context.OrderDetails
join customer in context.Customers
on customer.OrderID equals order.OrderID
join product in context.Products
on product.ProductID equals order.ProductID
select new
    {
        CustomerID = customer.CustomerID,
        CompanyName = customer.CompanyName,
        Country = customer.Country,
        CategoryID = product.CategoryID,
        Quantity = order.Quantity
    }
Query 8 - SDX (new):
from customer in context.Customers
from product in context.Products
from order in context.OrderDetails
orderby customer.Country,
product.CategoryID,
customer.CompanyName
select new
    {
        CustomerID = customer.CustomerID,
        CompanyName = customer.CompanyName,
        Country = customer.Country,
        CategoryID = product.CategoryID,
        Quantity = order.Quantity
    }
```

Using LINQ with languages other than LINQ in the same single query: Introduce a new set of methods—extension methods or operators that allow insertion of query fragments written in non-LINQ query languages (e.g. MDX, SQL) with an intention to return either Recordsets or scalar values.

By way of a non-limiting example:

```
Query 9 - Standard LINQ (conventional) - There is no analogy for
this
in a conventional LINQ yet.
Query 10 - SDX (new):
from customer in context.Customers
from order in context.OrderDetails
select new
    {
        UniqueName = MdxHelper.CalculatedMemberAsString(
            "[Measures].[CustomerID UniqueName]"
            , "[Customers].[Customer ID].CurrentMember.
            UniqueName"),
        Calculation = MdxHelper.CalculatedMemberAsInt(
            "[Measures].[CustomerID Calculation]"
            , "3 * 4"),
    }
Query 11 - Standard LINQ (conventional) - There is no analogy
for this in a standard LINQ yet.
Query 12 - SDX (new):
from table1 in context.Table1
join otherLanguageQuery in context.TableMdxQuery("mdx query")
on . . .
where context.ScalarMdxQuery("mdx query").AsInteger( ) ==
table1.Date.Month
select new
    {
        Month = table1.Date.Month,
        MdxValue = context.ScalarMdxQuery("mdx query").AsString(
        ),
        MdxSource = context.TableMdxQuery("mdx query")
    }
```

The above statement should translate into a single MDX query with or without sub-queries.

The following illustrates an example of how to translate/covert from LINQ to MDX. Differentiating between Measure Properties and Dimensional Properties: Either reserve and use separate data types for Measure Properties (e.g. "Double" and "Decimal" only, or new special custom types (class or struct)) or specify Measure Properties in metadata outside of a query (e.g. list of measures in OLAP cube metadata, list of Measure Properties in a file or class properties marked with special attributes like MeasurePropertyAttribute (metadata in .Net manifest)). Consider all non-Measure properties to be Dimensional properties.

Alternatively reserve data types for Dimensional Properties (e.g. String and Integer, or new custom types) or specify all Dimensional Properties in metadata outside of a query (e.g. list of cube dimensions and dimensional attributes, list of primary and foreign keys of a table, list of dimensional properties in a file or properties marked with a special attribute like DimensionalPropertyAttribute). Consider all non-Dimensional Properties to be Measure Properties.

Converting a LINQ query where projection properties (columns) can be specified in any order, into a MDX query which employs multiple axes and limits a sequence in which measures and dimensions have to be specified: Both LINQ to Entities and SQL queries internally return Recordsets where each row contains columns for both Dimensional and Measure Properties in the same sequence specified in a query projection (LINQ "select" clause). Measures can be mixed with dimensions in any order in the same single row. There is no distinction between Dimensional and Measure Properties in standard LINQ and SQL languages. MDX, however, is a multidimensional query language that does not allow mixing dimensional attributes and measures in the same result row in any arbitrary sequence (discussed further below). A typical MDX query employs 2 separate axes: ON COLUMNS (axis (0)) and ON ROWS (axis(1)). ON COLUMNS axis is mandatory if someone needs to query non-default measures. There is no exact equivalent for ON COLUMNS axis in LINQ or SQL.

The above issue is resolved by aspects of the invention as follows: (i) users are allowed to specify both Dimensional and Measure Properties in LINQ or SQL like queries in any order as they did before; (ii) when converting a query in LINQ or SQL into a query in MDX or similar language Measure Properties are always put into "ON COLUMNS" axis of the query regardless of an order of respective properties (columns) in LINQ select clause, but associated with an original position of a Measure Property in LINQ select clause; (iii) Dimensional Properties (columns) are always put into "ON ROWS" axis when translating into MDX, but associated with an original position of a Dimensional Property in LINQ select clause; and (iv) never use any axis other than "WHERE", "ON COLUMNS" and/or "ON ROWS" when translating into MDX. (v) At this point generated MDX can execute, but it returns all Dimensional Properties on the left side, and all Measure Properties on the right side of the result Recordset. An Object-Multidimensional Mapping component should rearrange a sequence of columns in a result Recordset according to the order specified in the original select clause of a query in LINQ or SQL. That original order is tracked during steps (iii) and (iv). If (v) is omitted, LINQ or SQL semantics would change and LINQ provider would throw an exception when converting the result Recordset into .Net objects (entities). A further description of this solution extended with design and implementation details specific to ADOMD.NET and ADO.NET Entity Framework is set forth later in this disclosure.

By way of a non-limiting example: If a SDX query is issued similar to the following:

```
from orderDetails in context.OrderDetails
select new
{
    orderDetails.ProductID, --Dimensional Property
    orderDetails.Quantity, --Measure Property
    orderDetails.OrderID, --Dimensional Property
    orderDetails.Discount, --Measure Property
    orderDetails.UnitPrice
}
It will be translated into MDX as follows:
SELECT
{ --Measures are separate
    [Measures].[Quantity],
    [Measures].[Discount],
    [Measures].[Unit Price]
} ON COLUMNS,
NON EMPTY
( --Dimensional attributes are separate
    [Products].[Product ID].[Product ID],
    [Orders].[Order ID].[Order ID]
) ON ROWS
FROM [NorthwindEF]
```

After MDX is executed the result Recordset has columns in the following sequence:
Product ID, Order ID, Quantity, Discount, Unit Price but the columns order is rearranged by Object-to-Multidimensional Mapping component back to the next original sequence in LINQ select clause as follows: Product ID, Quantity, Order ID, Discount, Unit Price. Those skilled in the art will recognize that LINQ property names do not have spaces, but some MDX names do include spaces—this can be dealt with in a configurable way by switching Object-Multidimensional Mapping component classes responsible for generated names using polymorphism (e.g. AddSpacesToCamelCasingWordsConvention naming convention class in SSAS Entity Framework Provider)

While not preferred, the following are possible alternative ways to address the issue of mixing Measure Properties with Dimensional Properties which would still fall within a scope of the invention. Users could specify all Dimensional Properties before any Measure Properties in all of their LINQ queries. Drawbacks to this solution are that it would be difficult to catch errors before run time and it is difficult to always separate Dimensional Properties from Measure Properties. Another possible solution would be to specify measures mixed with dimensional attributes in MDX queries by putting all of them onto a single ON ROWS axis using the MDX CrossJoin function. However, such a solution would return a Recordset with a different cardinality from what is expected by LINQ or SQL query semantics. MDX query would return a new row for each new measure specified. LINQ provider would throw an exception when converting the result Recordset into .Net objects. Mapper design pattern or other similar solution could re-map (un-pivot) related measures scattered in multiple rows back to a single row with multiple measures, but such a solution would have an adverse impact on performance.

Converting a LINQ query that returns both Dimensional and Measure Properties into a MDX query while preserving existing LINQ and SQL implied relational filtering semantics: The following explains how to return a Recordset containing only such a combination of Dimensional and Measure Properties that relate to each other in a cube data sources. It also explains how to filter out properly null valued cross-join combinations of dimensions and measures without filtering out records with measures that do exist in an underlying fact table but have null values.

Default MDX behavior in SSAS and other MDX OLAP servers is to return a Cartesian product of all permutations between different dimensions and measures including combinations that do not exist in a cube relational data source (e.g. do not make logical sense). SSAS will return results with NULL values for those combinations that do not exist. A typical solution used by other MDX generation tools is to apply NON EMPTY keyword. While that solution limits the result Recordset to those combinations of dimensions and measures that are actually present in a cube relational data source, it has a tendency to also filter out null measure values that do exist in the data source. This total filtering of all null values is a different behavior from semantics in LINQ, SQL and other relational query languages. Such null filtering behavior may distort the results and sometimes it is useful to know what measures have null values.

Aspects of the invention employ the EXISTS MDX function with 3 parameters, where the 3rd parameter is a name of a measure group which should be referenced by selected dimensions. Such a solution preserves relational query languages semantics, does not distort the results and works faster. If a LINQ query queries multiple measure groups, a separate EXISTS function should be used per each measure group and EXISTS functions should be nested into each other. Second argument of each EXISTS function may refer to a set of measures from a measure group mentioned in a third argument.

By way of a non-limiting example:

Input LINQ:
from customer in context.Customers

```
from order in context.OrderDetails
from product in context.Products
select new
{
    customer.CustomerID,
    customer.CompanyName,
    order.Quantity,
    order.Discount,
    product.UnitsInStock
}
Output MDX:
SELECT
EXISTS
(
    EXISTS
    (
        {(
            [Customers].[Customer ID].[Customer ID],
            [Customers].[Company Name].[Company Name]
        )},
        {
            [Measures].[Units In Stock]
        },
        "Products" --2nd Measure group name
    )
    {
        [Measures].[Quantity],
        [Measures].[Discount]
    },
    "OrderDetails" --1st Measure group name
)
ON ROWS,
{
    [Measures].[Quantity], --measure from the 1st measure group
    [Measures].[Discount], --measure from the 1st measure group
    [Measures].[Units In Stock] --measure from the 2nd measure
      group
}
ON COLUMNS
FROM [NorthwindEF]
```

Matching columns from MDX result recordset with column names following [DimensionName].[HierarchyName]. [LevelName] pattern to LINQ (or SQL) result column names following [ColumnName] pattern: Use positional binding, generate a dimensional attribute name or a measure name in MDX query in the same relative position where a matching LINQ Dimensional or Measure Property was specified by LINQ select clause. Typically 2 separate axes will be used in a generated MDX query, but the result Recordset has a shape of a regular table and a solution for this problem is described above (i-v). A specific design and implementation details will be described more fully below.

The following is a non-limiting example using the above techniques and features to convert/translate from LINQ/SDX to MDX:

```
Input SDX:
(
from customer in context.Customers
from order in context.OrderDetails
where ("Italy" == customer.Country
    || customer.Country == "USA")
    && order.Discount != 0
    && order.Quantity >= 100
orderby customer.Country,
    customer.Region ascending,
    order.Discount descending
select new
{
    customer.CustomerID,
    order.Quantity,
    customer.CompanyName,
```

```
    order.Discount
}
).Take(8)
Output MDX:
SELECT
NON EMPTY
(
HEAD
(
ORDER
(
ORDER
(
ORDER
(
(
FILTER
(
(
[Customers].[Customer ID].[Customer ID],
[Customers].[Company Name].[Company Name]
)
,
(((([Customers].[Country].MemberValue = 'Italy') OR
([Customers].[Country].MemberValue = 'USA')) AND
([Measures].[Discount] <> 0))
AND ([Measures].[Quantity] >= 100)
)
)
,
[Measures].[Discount],
BDESC
)
,
[Customers].[Region].MemberValue,
BASC
)
,
[Customers].[Country].MemberValue,
BASC
)
,
8
)
)
ON ROWS,
{
[Measures].[Quantity],
[Measures].[Discount]
}
ON COLUMNS
FROM [NorthwindEF]
```

Design and Implementation Considerations for Object-Multidimensional Mapping Component and LINQ to MDX Translation with SSAS Entity Framework Provider as an Example: Converting a LINQ query where projection properties (columns) can be specified in any order into MDX query which employs multiple axes and limits a sequence in which measures and dimensions have to be specified.

As stated above, both LINQ and SQL queries return Recordsets where each row contains columns for both Dimensional and Measure Properties in a sequence specified by a query projection (LINQ "select" clause). Measures can be mixed with dimensions in any order in the same single row. There is even no distinction between Dimensional and Measure Properties in a standard LINQ and SQL languages. But MDX does not allow such behavior. Someone has to specify all Dimensional Properties in ON ROWS axis and Measure Properties in ON COLUMNS axis in a MDX query in order to get all specified properties in the same single row. However, such action results in a Recordset where all Dimensional Properties are returned on the left side of the Recordset and all Measure Properties are on the right side. If someone issued a LINQ query similar to the following:

```
from orderDetails in context.OrderDetails
select new
{
    orderDetails.ProductID, --Dimensional Property
    orderDetails.Quantity, --Measure Property
    orderDetails.OrderID, --Dimensional Property
    orderDetails.Discount, --Measure Property
    orderDetails.UnitPrice
}
and converted it into MDX like that:
SELECT
{ --Measures are separate
    [Measures].[Quantity],
    [Measures].[Discount],
    [Measures].[Unit Price]
} ON COLUMNS,
NON EMPTY
( --Dimensional attributes are separate
    [Products].[Product ID].[Product ID],
    [Orders].[Order ID].[Order ID]
) ON ROWS
FROM [NorthwindEF]
```

ADOMD.NET would execute the MDX query but any current LINQ provider for SQL such as ADO.NET Entity Framework would throw an exception when converting the result Recordset into .Net objects (entities). An exception would be thrown because a LINQ provider expects columns in the exact order specified by the LINQ query where a Measure Property can be followed by a Dimension Property such as in the example.

As stated above, a possible solution would be to specify all Dimensional Properties before any Measure Properties in all LINQ queries, but that solution would be difficult to follow because it would be difficult to realize errors before run time and it is difficult to remember what properties are Dimensional Properties and what are Measure Properties.

Another solution is to put both Dimensional and Measure Properties into a single ON ROWS axis using CrossJoin MDX function and put any member from "All" level of any attribute hierarchy into ON COLUMNS axis. (Note: if ON COLUMNS axis is left empty ("{ }") no measure values will be returned, only measure captions). Such MDX query will execute and return multiple rows (one per each measure) with a single measure value per single row. But LINQ provider (e.g. Entity Framework) expects multiple related measures in the same row. In order to avoid an error in a LINQ provider when it tries to populate object graph (entities) from MDX result Recordset, a class extending AdomdDataReader (e.g. SsasDataReader P6 of FIG. 1) should re-map multiple rows with a single measure value into a single row with multiple related measures expected by a LINQ provider (e.g. by ADO-.NET Entity Framework) before returning the result Recordset back to a LINQ provider. A good implementation is to use Mapper design pattern to do that kind of re-mapping.

A preferred but not required solution which provides better performance is to:
1. Follow the steps provided in the description above (i-iv);
2. Rearrange a sequence of columns in a result Recordset according to the order specified in the original LINQ query. (this is related to (v) above but contains design and implementation details specific to ADOMD.NET and ADO.NET Entity Framework). A simple way to perform this column sequence rearrangement is inside of a class extending AdomdDataReader (see P6, FIGS. 1 and 3):
    a. MDX generation component (described above and illustrated in FIGS. 1 and 2, P2, P3 and P4) records both LINQ original and new MDX column sequences and the mapping between them;
    b. MDX generation component (P2) passes that mapping together with a generated MDX to AdomdCommand extended with a property for this mapping via a class extending DbProviderServices (P1);
    c. When Entity Framework calls DbCommand.ExecuteDbDataReader( ), class extending AdomdCommand (P8, FIGS. 1 and 3) in turn passes the column mapping further to a class extending AdomdDataReader (P6;
    d. An extended AdomdDataReader (P6) would use that column mapping to rearrange a column sequence according to the original column sequence specified in LINQ select clause.

Because a MDX select statement uses 2 axes (ON COLUMNS and ON ROWS) and LINQ uses just one list of columns in its select clause, there is a need to convert 2 positional indexes for both columns axis and rows axis into a single positional index corresponding to a column position in an original LINQ select clause. This can be done during adding measures into ON COLUMNS axis by shifting currentColumnsAxisColumnIndex for each new measure on a final number of Dimensional Properties in ON ROWS axis (RowsAxisColumnIndex final value). That final value of RowsAxisColumnIndex is known only after all dimensions are already added into ON ROWS axis.

By way of a non-limiting example:

MDX generation component MdxGenerator (P2 on FIGS. 1 and 2) adds dimensional attributes into ON ROWS axis (MdxSelectStatement.Select property inherited from SqlSelectStatement) of MdxSelectStatement (P3). MdxGenerator (P2) also adds measures into ON COLUMNS axis of MdxSelectStatement (P3) (MdxSelectStatement.ColumnsAxis property). Whenever a new member (column) is added into properties of MdxSelectStatement (P3) corresponding to ON ROWS or ON COLUMNS axes, MdxSelectStatement calls UpdateRowsAxisColumnOrder( ) or UpdateColumnsAxisColumnOrder( ) methods of ColumnOrderTracker (P4 on FIG. 1) respectively. ColumnOrderTracker (P4) increments ColumnsAxisColumnIndex and RowsAxisColumnIndex properties and updates its LinqToMdxColumnsOrder dictionary property at the end when all dimensional attributes are already added into ON ROWS axis. MdxSelectSstatement (P3) takes the final column positional mapping (value of ColumnOrderTracker.LinqToMdxColumnOrder property) from ColumnOrderTracker (P4) and returns that column mapping into MdxGenerator (P2). MdxGenerator passes the column mapping together with a generated MDX into SsasProvider.CreateCommand( ) method (P1), SsasProvider (P1) passes the column mapping into SsasCommand (P8). When Entity Framework calls DbCommand.ExecuteDbDataReader( ) it uses a registered SSAS Entity Framework Provider extension of DbCommand—SsasCommand (P8), so Entity Framework calls SsasCommand.ExecuteDbDataReader( ) via polymorphism. SsasCommand.ExecuteDbDataReader( ) passes this mapping further into SsasDataReader.MdxColumnsOrder (P6) property, and SsasDataReader (P6) uses the column mapping in all of its GetXxx( ) methods as described below. SsasDataReader (P6 on FIGS. 1 and 3) extends AdomdDataReader by adding MdxColumnsOrder property using composition (note: it is not presently possible to use inheritance to extend most of ADOMD.NET classes because those are declared as sealed). When Entity Framework DbCommand executes SsasCommand.ExecuteDbDataReader( ) method SsasCommand (P8) delegates data read execution to AdomdCommand.ExecuteDbDataReader( ) which returns AdomdDataReader instance with query results. SsasCommand (P8) creates an instance of SsasDataReader (P6) passing AdomdDataReader into its constructor and setting SsasDataReader.MdxColumnOrder property with the value of its own SsasCommand.MdxColumnOrder property.

SsasDataReader (P6) rearranges a column order in the result Recordset by using SsasDataReader.MdxColumnsOrder property. SsasDataReader.MdxColumnsOrder property is a dictionary (P5) where dictionary keys are integer values for a column position in original LINQ statement and dictionary values are integer values for a column position in the result Recordset returned by MDX query. Whenever any GetXxx( ) method (e.g. GetDouble( ) or GetString( ) of SsasDataReader is called, SsasDataReader rearranges MDX column order to LINQ original column order using code similar to the following:

```
public override string GetString(int ordinal)
{
    return
        StoreDataReader.GetString(MdxColumnsOrder[ordinal]);
}
```

The following is a full working non-limiting sample implementation of ColumnOrderTracker (P4) class:

```
using System;
using System.Collections.Generic;
using System.Linq;
namespace
AgileDesign.SsasEntityFrameworkProvider.Internal.MdxGeneration
{
    class ColumnOrderTracker
    {
        //Column indexes are 0-based in AdomdDataReader
        int linqColumnIndex;
        int columnsAxisColumnIndex;
        public int ColumnsAxisColumnIndex
        {
            get { return columnsAxisColumnIndex; }
        }
        int rowsAxisColumnIndex;
        public int RowsAxisColumnIndex
        {
            get { return rowsAxisColumnIndex; }
        }
        Dictionary<int, Func<int>> linqToMdxColumnsOrder_Delayed;
        IDictionary<int, Func<int>> LinqToMdxColumnsOrder_Delayed
        {
            get
            {
                return linqToMdxColumnsOrder_Delayed
                    ?? (linqToMdxColumnsOrder_Delayed = new
Dictionary<int, Func<int>>( ));
            }
        }
        public IDictionary<int, int> LinqToMdxColumnsOrder
        {
            get
            {
                return LinqToMdxColumnsOrder_Delayed
                    .ToDictionary(i => i.Key, i => i.Value( ));
            }
        }
        public void UpdateColumnsAxisColumnOrder( )
        {
            int currentColumnsAxisColumnIndex =
            ColumnsAxisColumnIndex;
            LinqToMdxColumnsOrder_Delayed[linqColumnIndex]
                = (( ) => RowsAxisColumnIndex +
                currentColumnsAxisColumnIndex);
            columnsAxisColumnIndex = ColumnsAxisColumnIndex + 1;
            linqColumnIndex = linqColumnIndex + 1;
        }
        public void UpdateRowsAxisColumnOrder( )
        {
            int currentRowsAxisColumnIndex = RowsAxisColumnIndex;
            LinqToMdxColumnsOrder_Delayed[linqColumnIndex]
                = (( ) => currentRowsAxisColumnIndex);
            rowsAxisColumnIndex = RowsAxisColumnIndex + 1;
            linqColumnIndex = linqColumnIndex + 1;
        }
    }
}
input - SDX query:
from customer in context.Customers
from product in context.Products
from order in context.OrderDetails
select new
{
    CustomerID = customer.CustomerID,
    CompanyName = customer.CompanyName,
    Quantity = order.Quantity,
    Country = customer.Country,
    CategoryID = product.CategoryID
}
output - input translated into MDX:
SELECT
NON EMPTY
(
[Customers].[Customer ID].[Customer ID],
[Customers].[Company Name].[Company Name],
[Customers].[Country].[Country],
[Categories].[Category ID].[Category ID]
)
ON ROWS,
{
[Measures].[Quantity]
}
ON COLUMNS
FROM [NorthwindEF]
```

SsasDataReader (P6) reads a Recordset from SSAS with columns in this sequence: Customer ID, Company Name, Country, Category ID, Quantity, but it returns a Recordset with columns in the next original LINQ sequence: Customer ID, Company Name, Quantity, Country, Category ID.

Translating .NET variables and method parameters in LINQ where clause into MDX members and MDX filter( ) function values: This can be done in 3 steps:

1. When overriding DbProviderServices.CreateDbCommandDefinition( ) add parameters to a result DbCommand per each parameter expression of DbParameterReferenceExpression type from commandTree.Parameters collection of commandTree input parameter. Names of DbCommand parameters should match with keys in DbCommandTree.Parameters dictionary. Do not assign parameter values for parameters in DbCommand. Do not use "@" for parameters in DbCommand.

2. When generating MDX translate DbParameterReferenceExpression.ParameterName into a parameter value placeholder named as a parameter. (e.g. if parameter name is "p_linq_country" translate it into "<p_linq_country>")

3. In SsasCommand replace the named parameter value placeholder with the actual parameter value before MDX is executed. Entity Framework will populate parameters in SsasCommand.Parameters with their values before SsasCommand is executed.

Figure 2:
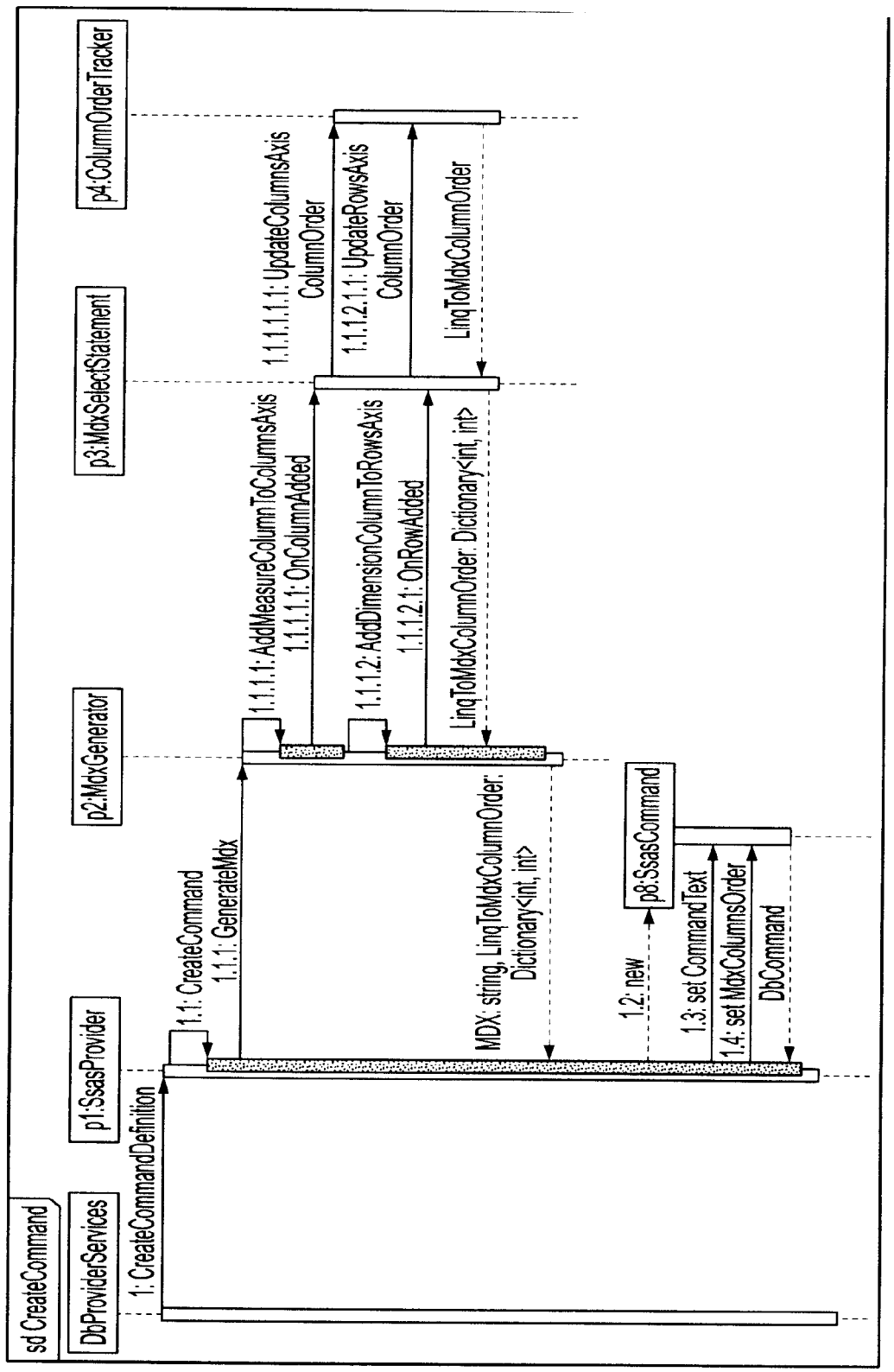
FIG. 2 is a sequence diagram illustrating how a conventional MDX generation component maintains and passes MdxColumnOrder mapping into SsasCommand.
Figure 3:
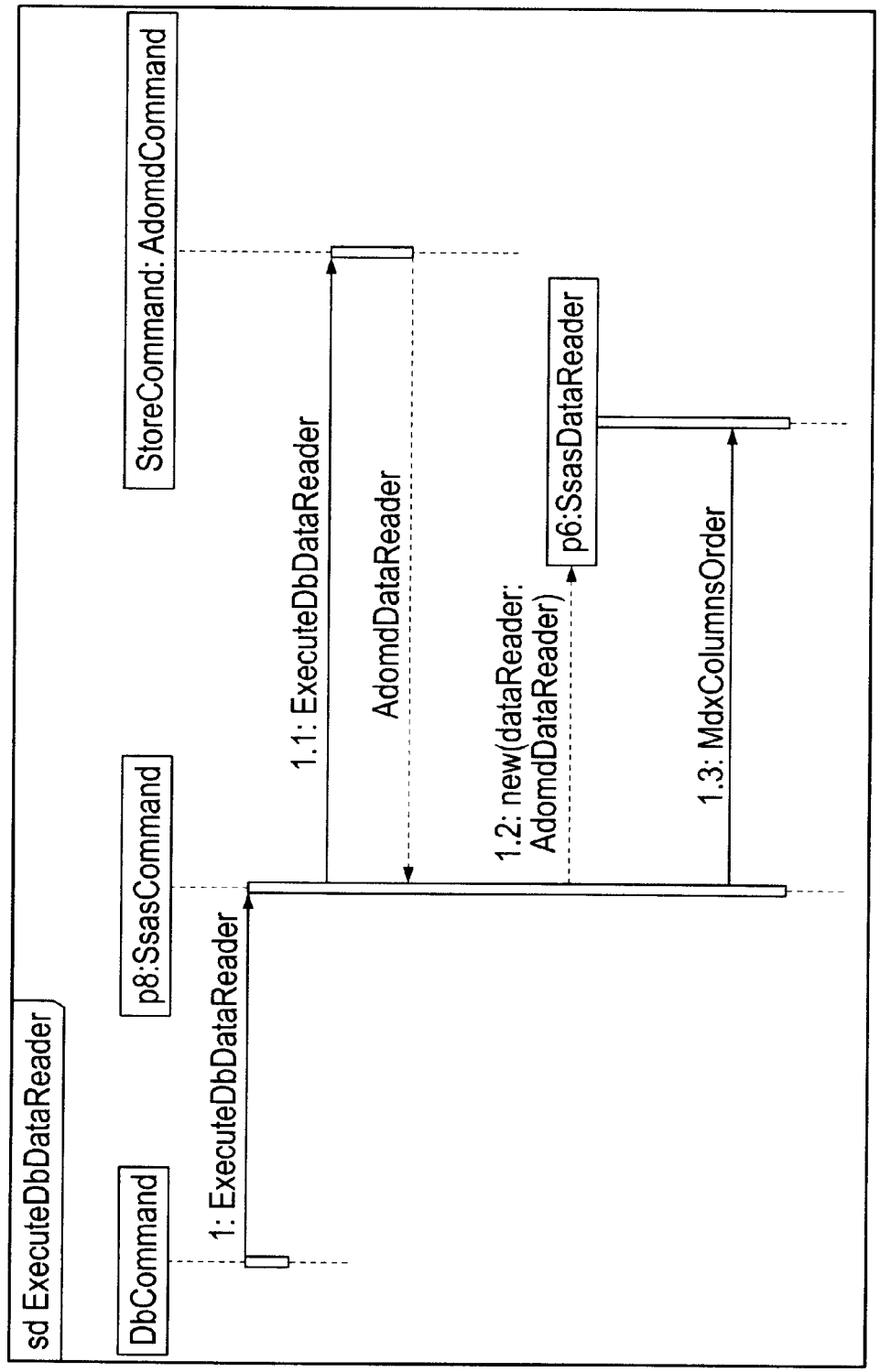
FIG. 3 is a sequence diagram illustrating how a SsasCommand passes its MdxColumnOrder mapping into SsasDataReader.
Figure 4:
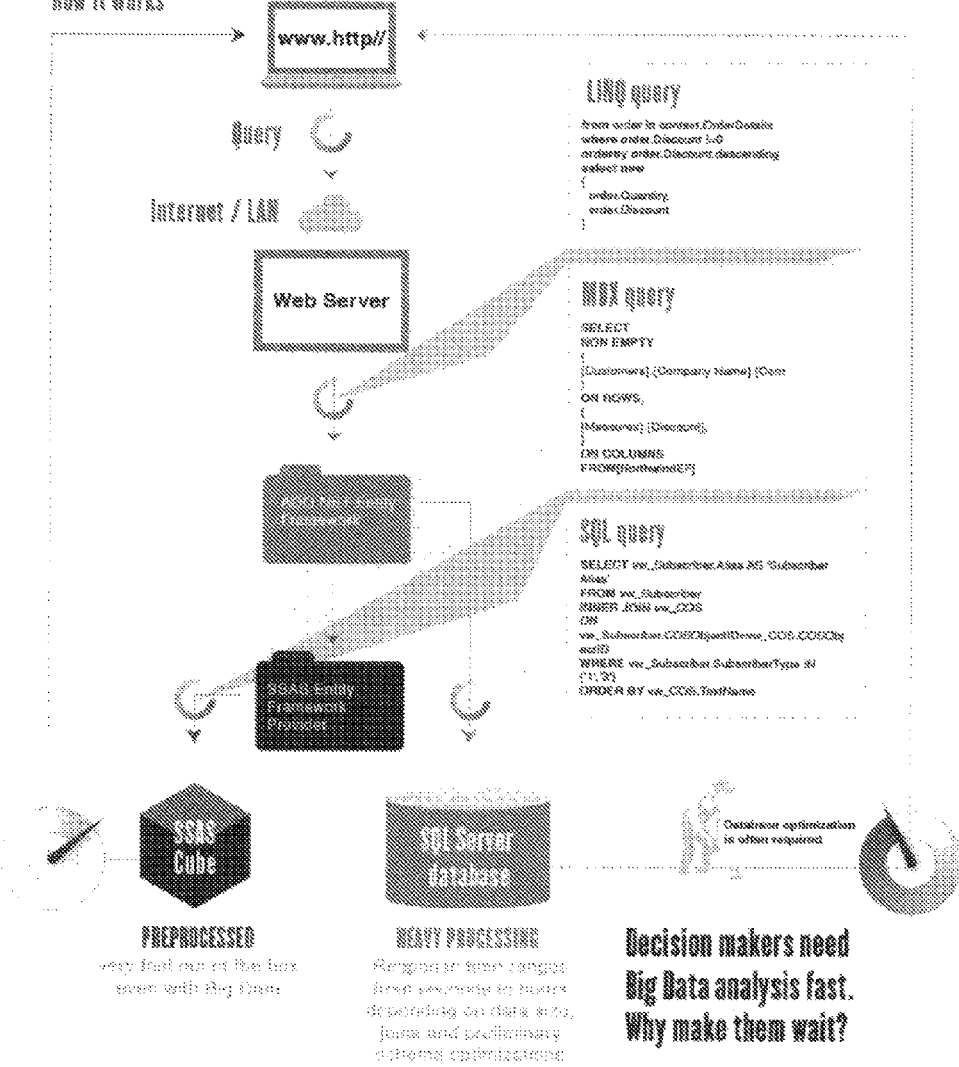
FIG. 4 is a Flow chart illustrating a query language in accordance with aspects of the invention.
Figure 5:
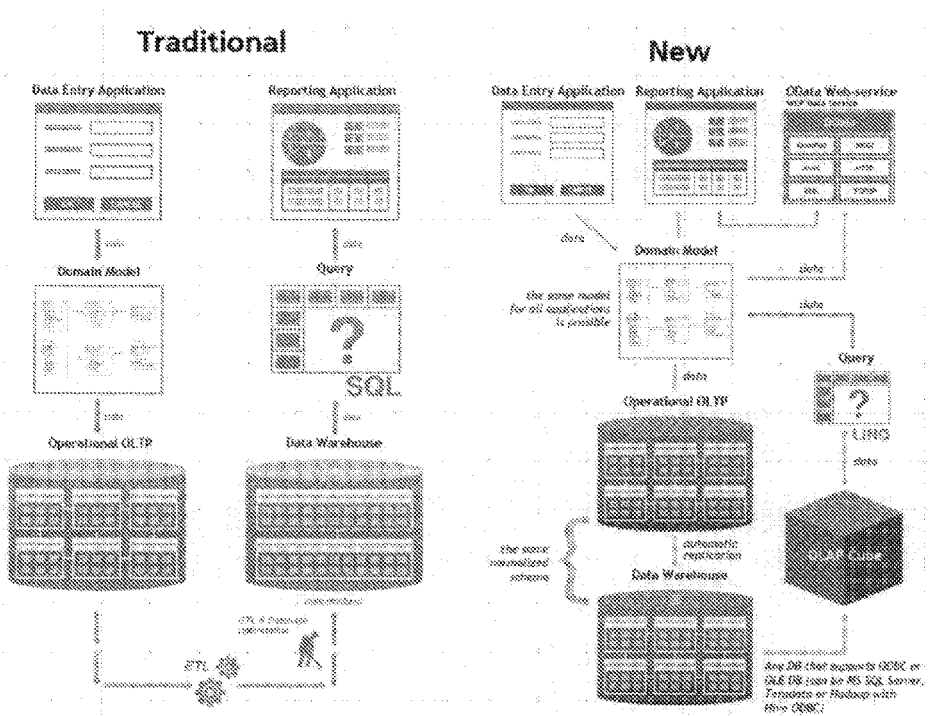
FIG. 5 is a side-by-side Flow chart comparing conventional data querying methods to data querying in accordance with aspects of the invention; AND, FIG. 6 is block diagram of a system in accordance with aspects of the invention.
Figure 6:
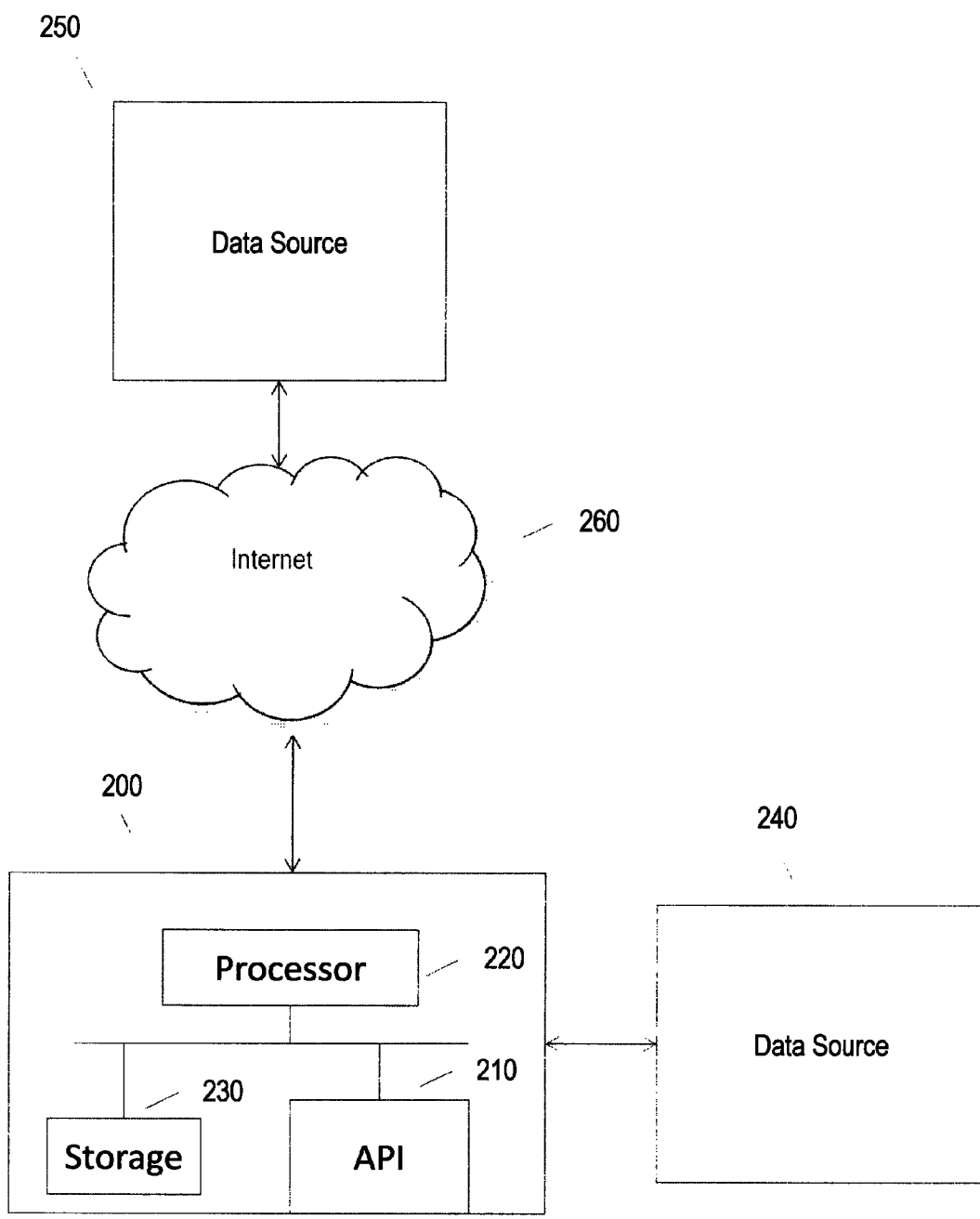

Data and control flow for replacing parameter placeholders with respective values is almost the same as for passing MdxColumnOrder mapping from MdxGenerator to SsasCommand steps shown on left part of FIG. 2. The difference is that MdxSelectStatement (P3) and ColumnOrderTracker (P4) are not involved, and there is no need in out parameter and additional properties when passing named parameter placeholders from MdxGenerator (P2) to SsasCommand (P8) because parameter placeholders are passed into SsasCommand (P8) as parts of generated MDX string.

Converting a LINQ query that does not have measure properties among projected properties in it its select clause into MDX: ADOMD.NET can execute an MDX query that has an empty set "{ }" in ON COLUMNS axis, but it will not return values of Measure Properties in such a case, it will return only measure captions. To resolve this issue, the program generates a dummy calculated member with any fake value, and puts that calculated member into ON COLUMNS axis.

By way of a non-limiting example:
WITH MEMBER [Measures].[Dummy] AS NULL SELECT [Customers].[Company Name].[Company Name] ON ROWS, [Measures].[Dummy] ON COLUMNS FROM [NorthwindEF]

Constants that are generated by Entity Framework in a command tree: Entity Framework sometimes generates constants in the command tree which is an input to MDX generation component (e.g. MdxGenerator (P2)). Typically the constant looks like a column named "Cx" (e.g. C1) and that constant's value is "1". Regardless that MDX generation component does not need or use that constant value, LINQ to MDX generation and MDX query execution components cannot entirely ignore that constant. Entity Framework expects the constant value to be returned as a result of LINQ query, and if that constant is missing in the result Recordset Entity Framework throws an error. To resolve this issue: (a) Extend AdomdDataReader class (e.g. SsasDataReader (P6)) to return a constant value="1" in place of original Cx constant. MDX generation component (MdxGenerator (P2)) should supply a position of that constant into extended AdomdDataReader (e.g. SsasDataReader (P6)), and the extended AdomdDataReader returns 1 whenever the position of a constant Cx is requested. (b) MDX generation component generates a calculated member-measure with a constant value="1" in a position corresponding to that constant. In such a case AdomdDataReader just returns the value from Cx column as is, without any manipulations with the result Recordset.

Supplying a cube name into MDX query generated by MDX generation component of a LINQ provider: ADO.NET Entity Framework does not supply a cube name into SQL or MDX generation classes; it provides them with a command tree only. Neither the command tree nor an original LINQ query contains anything related to a cube name. But a MDX query must specify a correct cube name in it's FROM clause in order to be executed successfully. A resolution to this issue is to save a cube name into a shared persistent storage like connection string in an application configuration file and read that cube name from that storage later during each MDX generation. Another resolution to this issue, which also works with dynamically supplied cube names, is to extend AdomdConnection class (e.g. SsasConnection (P7)) with a new property for a cube name (e.g. SsasConnection.CubeName) and assign a cube name to that property before running LINQ query. But in this case MDX generation component (MdxGenerator (P2)) still does not have an access to that cube name. Thus MDX generation component should use a placeholder instead of a real cube name. Also AdomdDataReader class (e.g. SsasDataReader (P6)) should be extended with a behavior that reads cube name from an instance of an extended connection class (e.g. from SsasConnection.CubeName) and replaces cube name placeholder with a real cube name.

By way of a non-limiting example:

LINQ input
   from customer in context.Customers
   select new

-continued

```
{
    CompanyName = customer.CompanyName,
}
```
is translated by MdxGenerator into this unfinished MDX:
WITH MEMBER [Measures].[Dummy] AS NULL
SELECT [Customers].[Company Name].[Company Name] ON ROWS,
[Measures].[Dummy] ON COLUMNS
FROM <CubeNamePlaceholder>
And finally SsasDataReader converts it into an executable MDX statement with a proper cube name:
WITH MEMBER [Measures].[Dummy] AS NULL
SELECT [Customers].[Company Name].[Company Name] ON ROWS,
[Measures].[Dummy] ON COLUMNS
FROM [NorthwindEF]

Another solution is to extend LINQ API with an extension method which takes a cube name as a parameter and supplies a cube name into that extension method in each LINQ query. By way of a non-limiting example:

```
from customer in context.CubeName("[NorthwindEF]").Customers
select new
{
    CustomerID = customer.CustomerID,
    CompanyName = customer.CompanyName,
    Country = customer.Country
}
```

Associating a Dimensional Property name in LINQ query with a cube dimension name in MDX query in order to generate an MDX query with a fully qualified dimensional attribute following [DimensionName].[HierarchyName].[LevelName] MDX Pattern: LINQ query references only class names and their property names. There is no reference to a dimension name in LINQ. The following illustrates how to get a dimension name when generating MDX.

A simple solution would be to generate MDX with dimensional attribute references without a corresponding dimension name. But this solution will not work if there are properties with the same name but belonging to different classes (and dimensions) in the same LINQ query. Also a MDX query that misses dimension names in its dimensional attribute references will execute slower.

A better solution is to use some form of persistent metadata in order to map a name of a class-owner of a dimensional property to a dimension name, persist and reuse that metadata mapping during MDX generation. The following are some non-limiting examples of how to map properties to dimensions and how to store those mappings in metadata:

a. Use .NET attributes taking dimension name as a parameter and persisting that information into .NET manifest.

b. Use XML file saved on disk.

c. Use some class naming convention—for instance a convention when name of a class coincides with a dimension name.

SSAS Entity Framework Provider can use any of these approaches because it reuses naming conventions, mapping attributes or XML mappings used by ADO.NET Entity Framework infrastructure. Entity Framework associates table name with a class by means of any of these techniques, and SSAS Entity Framework Provider takes a table name from Entity Framework and uses it as a dimension name, optionally using AddSpacesToCamelCasingWordsConvention naming convention to convert a table name like "SomeName" into a dimension name like "Some Name".

Thus it is seen that a two-dimensional query language that can operate to query multi-dimensional OLAP data sources and other MDX servers is provided. Although particular embodiments have been disclosed herein in detail, this has been done for purposes of illustration only, and is not intended to be limiting with respect to the scope of the claims, which follow. In particular, it is contemplated by the inventor that various substitutions, alterations, and modifications may be made without departing from the spirit and scope of the invention as defined by the claims. For example, the system is described as being set up as a program running on a computer that communicates over the Internet, local area network or inter-process channels with a data source. However, the system could also function with multiple computers and/or servers configured to perform the various operations and/or communications could take place via a network other than the Internet. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described systems is envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by one or more application specific integrated circuits and/or optical elements. Suitably, the computer program can be stored on a carrier medium in computer usable form, which is also envisaged as an aspect of the invention. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. An apparatus configured to retrieve data from an Online Analytical Processing ("OLAP") data source or MDX servers of other types, wherein said data source has associated meta-data, said apparatus comprising:
a computing device;
an application programming interface ("API") configured to operate within said computing device;
said API configured to receive a two-dimensional query written in a two-dimensional query language such that said query includes a sequenced list of requested columns wherein said sequenced list includes a mixed order of measure columns and dimensional columns;
said computing device configured to convert said two-dimensional query into a multi-dimensional query which is compatible with a multi-dimensional query language such that said measure columns are separated from said dimensional columns; and,
said computing device configured to retrieve data responsive to said multi-dimensional query.

2. The apparatus according to claim 1 wherein said two-dimensional query language includes Language Integrated Query ("LINQ").

3. The apparatus according to claim 1 wherein said API includes a LINQ API modified with simplified aggregation, group by clauses, orderby clauses, joins, and new sets of methods.

4. The apparatus according to claim 3 where said computing device utilizes LINQ and said metadata associated with said data source and wherein unspecified but necessary aggregation, joining and grouping operations of LINQ are implied from said metadata.

5. The apparatus according to claim 1 wherein said multi-dimensional query language includes Multi-Dimensional eXpressions ("MDX").

6. The apparatus according to claim 1 wherein said apparatus is selectively connected to the communications network;
said data is located on at least one MDX server; and,
said apparatus communicates with said MDX server via said communications network.

7. The apparatus according to claim 1 wherein said apparatus is selectively connected to the communications network;
said data is located on an OLAP data source; and,
said apparatus communicates with said OLAP data source via said communications network.

8. The apparatus according to claim 1 wherein said data is located on said computing device.

9. The apparatus according to claim 1, wherein said computing device is configured to perform an operation on said retrieved data;
said operation being selected from at least one member of the group consisting of joining, grouping, filtering and/or sorting said data and converting it into a format expected by an input query.

10. A method of retrieving data from an Online Analytical Processing ("OLAP") data source, wherein said data source has associated meta-data, said method comprising:
providing a computing device that is selectively and communicatively coupled to a network;
providing an Application Programming Interface ("API") operating on said computing device;
said computing device receiving as input via said API a two-dimensional query formulated in a two-dimensional query language such that said query includes a sequenced list of requested columns wherein said sequenced list includes a mixed order of measure columns and dimensional columns;
said computing device converting said two-dimensional query into a multi-dimensional query which separates said measure columns from said dimensional columns and employing said multi-dimensional query to retrieve data from said data source.

11. The method according to claim 10 wherein said two-dimensional query language includes Language Integrated Query ("LINQ").

12. The method according to claim 10 wherein said API is formed by modifying a LINQ API with simplified aggregation, group by sections, orderby clauses, joins, and new sets of methods.

13. The method according to claim 12 further comprising said computing device utilizing LINQ and said metadata associated with said data source to imply unspecified but necessary aggregation, joining and grouping LINQ operators.

14. The method according to claim 10 wherein said multi-dimensional query language includes Multi-Dimensional eXpressions ("MDX").

15. The method according to claim 10, further comprising said computing device performing an operation on said retrieved data;
said operation being selected from at least one member of the group consisting of joining, grouping, filtering and/or sorting said data and converting it into a format expected by an input query.

16. The method according to claim 10, wherein said two-dimensional query language is Language integrated Query ("LINQ"), said multi-dimensional query language is Multi-Dimensional eXpressions ("MDX") and wherein said converting comprises:
placing a Measure Property from a SELECT clause of said two-dimensional query into an ON COLUMNS axis of said multi-dimensional query and associating said Measure Property with a position of said Measure Property in said SELECT clause; and,
placing a Dimensional Property from said SELECT clause into an ON ROWS axis of said multi-dimensional query and associating said Dimensional Property with a position of said Dimensional Property in said SELECT clause.

17. The method according to claim 16 further comprising:
placing a plurality of Measure Properties from said SELECT clause of said two-dimensional query into said ON COLUMNS axis of said multi-dimensional query and associating said plurality of Measure Properties with a plurality of respective positions of said plurality of Measure Properties in said SELECT clause; and,
placing a plurality of Dimensional Properties from said SELECT clause of said two-dimensional query into said ON ROWS axis of said multi-dimensional query and associating said plurality of Dimensional Properties with a plurality of respective positions of said plurality of Dimensional Properties in said SELECT clause.

18. The method according to claim 16 further comprising:
receiving a Resultset from said multi-dimensional query wherein said Resultset includes Dimensional Properties on a left side and Measure Properties on a right side of said Resultset;
an Object-Multidimensional Mapping component of said MDX arranging a sequence of columns in said Resultset according to an order specified in said SELECT clause.

19. The method according to claim 10, wherein said two-dimensional query language is Language Integrated Query ("LINQ"), said multi-dimensional query language is Multi-Dimensional eXpressions ("MDX") and wherein said converting comprises:
utilizing an EXISTS function of LINQ wherein said EXISTS function includes three parameters and wherein at least one of said parameters is a name of a Measure Group.

20. The method according to claim 19 wherein said name is referenced by Dimensional Properties.

21. The method according to claim 19 further comprising utilizing a plurality of nested EXIST functions.

22. The method according to claim 10, wherein said two-dimensional query language is Language Integrated Query ("LINQ"), said multi-dimensional query language is Multi-Dimensional eXpressions ("MDX") and wherein said converting comprises:
generating a Dimensional attribute name in said MDX query in a same relative position where a matching LINQ Dimensional Property is specified by a LINQ SELECT clause.

23. The method according to claim 10, wherein said two-dimensional query language is Language Integrated Query ("LINQ"), said multi-dimensional query language is Multi-Dimensional eXpressions ("MDX") and wherein said converting comprises:
generating a Measure name in an MDX query in a same relative position where a matching LINQ Measurement Property is specified by a LINQ SELECT clause.

24. The method according to claim 10, wherein said two-dimensional query language is Language Integrated Query ("LINQ"), said multi-dimensional query language is Multi-Dimensional eXpressions ("MDX") and wherein said converting comprises:
generating a dummy calculated member with a fake value and placing said calculated member into ON COLUMNS axis in the position expected by ADO.NET Entity Framework.

25. A method of retrieving data from an Online Analytical Processing ("OLAP") data source, wherein said data source has associated meta-data, said method comprising:
providing a computing device that is communicatively coupled to a network;
providing an Application Programming Interface ("API") operating on said computing device;
said computing device receiving as input via said API a two-dimensional query formulated in a two-dimensional query language such that said query includes a sequenced list of requested columns wherein said sequenced list includes a mixed order of measure columns and dimensional columns;
said computing device converting said two-dimensional query into a multi-dimensional query which separates said measure columns from said dimensional columns and employing said multi-dimensional query to retrieve data from said data source via said network.

26. A method of retrieving data from an MDX server, wherein said data source has associated meta-data, said method comprising:
providing a computing device that is communicatively coupled to a network;
providing an Application Programming Interface ("API") operating on said computing device;
said computing device receiving as input via said API a two-dimensional query formulated in a two-dimensional query language such that said query includes a sequenced list of requested columns wherein said sequenced list includes a mixed order of measure columns and dimensional columns;
said computing device converting said two-dimensional query into a multi-dimensional query which separates said measure columns from said dimensional columns and employing said multi-dimensional query to retrieve data from said data source via said network.

27. A method of retrieving data from an Online Analytical Processing ("OLAP") data source, wherein said data source has associated meta-data, said method comprising:
providing a computing device having said OLAP data source stored thereon;
providing an Application Programming Interface ("API") operating on said computing device;
said computing device receiving as input via said API a two-dimensional query formulated in a two-dimensional query language such that said query includes a sequenced list of requested columns wherein said sequenced list includes a mixed order of measure columns and dimensional columns;
said computing device converting said two-dimensional query into a multi-dimensional query which separates said measure columns from said dimensional columns and employing said multi-dimensional query to retrieve data from said data source.

* * * * *